United States Patent
Smith et al.

(10) Patent No.: US 6,328,396 B1
(45) Date of Patent: Dec. 11, 2001

(54) COMBINING MULTIPLE PRINTMODES INTO A SINGLE CARRIAGE SWEEP

(75) Inventors: Stephen A. Smith, Ridgefield; William S. Osborne, Camas, both of WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/479,515

(22) Filed: Jan. 7, 2000

(51) Int. Cl.[7] .............................. B41J 29/38; B41J 15/00
(52) U.S. Cl. ...................................................... 347/9
(58) Field of Search ............................. 347/5, 9, 12, 14, 347/40, 41; 325/102

(56) References Cited

U.S. PATENT DOCUMENTS

| | | | |
|---|---|---|---|
| 4,855,752 | * 8/1989 | Bergstedt | 347/41 |
| 4,967,203 | * 10/1990 | Doan et al. | 347/41 |
| 5,731,823 | 3/1998 | Miller et al. | 347/5 |
| 6,158,834 | * 12/2000 | Kato et al. | 347/9 |
| 6,168,320 | * 1/2001 | Ono et al. | 395/102 |

* cited by examiner

Primary Examiner—Anh T. N. Vo

(57) ABSTRACT

A method of reducing a time required for an inkjet printer to print a page minimizes unused pen nozzles during printmode transitions. An image to be printed is typically partitioned into different image regions based on a content of each region, such as text, graphics, or photographic images, each characterized by a different printmode. The image is represented in terms of rows of dots, each dot printed by a pen nozzle as a print carriage sweeps across an output medium. The data representing the dots that are printed in a single sweep is termed a swath. According to the method, a swath contains data from more than one image region, thus reducing the number of swaths required to print an image.

14 Claims, 5 Drawing Sheets

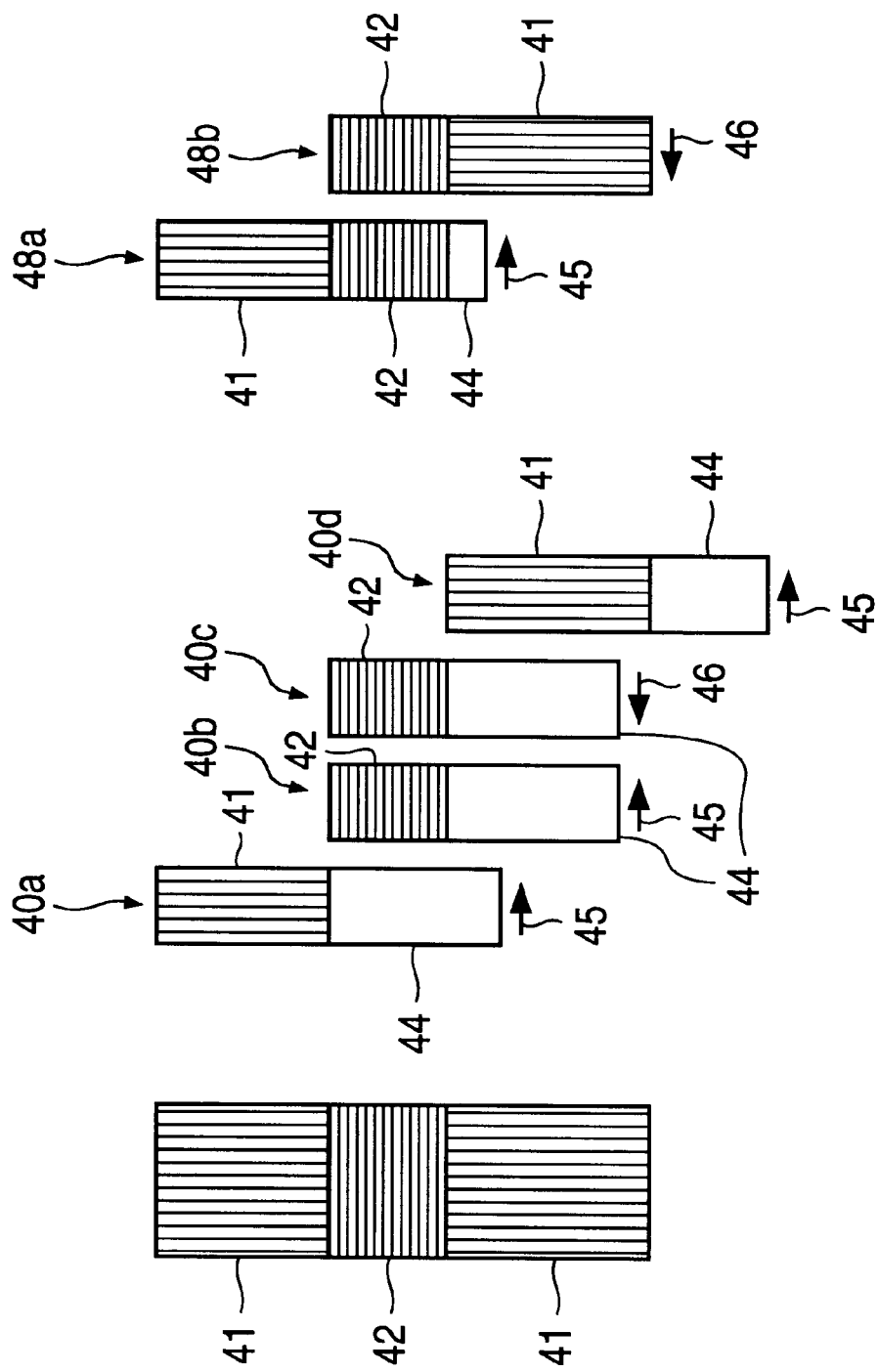

COMBINING MULTIPLE PRINTMODES INTO A SINGLE CARRIAGE SWEEP

TECHNICAL FIELD

This invention relates to inkjet printers and, in particular, to a method for reducing the time required for an inkjet printer to print a page.

BACKGROUND

Inkjet printers are well known and extremely popular. Particular inkjet printers are described, for example, in U.S. Pat. Nos. 5,648,806, 4,855,752, and 4,967,203. An inkjet printer ejects fine droplets of ink onto a print medium, principally paper, from precisely formed nozzles in one or more printheads. High quality color inkjet printers include printheads, alternatively termed pens, typically for the three subtractive primary color inks, cyan, magenta, and yellow, and a separate printhead for black ink. When printing a color image, droplets, or dots, of the three primary colors are printed in various combinations to achieve the desired color tones, or hues, to reproduce the original color image. Inkjet printers including printheads for additional color inks, for example, for seven color inks, are also known. Multiple drops of the same color may be used for a single color spot to increase the intensity of that color in the color spot.

In an inkjet printer, printing is performed as a print carriage conveying the pens is scanned across a print medium. Printing multiple drops requires multiple passes of the print carriage across the same portion of the print medium. Printing may be performed in both directions, that is as the print carriage sweeps from left to right across the medium and as it sweeps from right to left. The data to be printed on a page is typically partitioned into regions based on the nature of the content of each region. A distinct printmode, or collection of printing techniques, is used to optimize the print quality and printing speed of each region. For example, different printmodes are used for text and for graphics. Printmode parameters include, but are not limited to, the number of drops per location, which is related to the number of passes, output resolution, sweep speed, and sweep direction.

A region is printed during one or more sweeps of the carriage over the medium, and each region is completed before the next is begun. Data from two regions is never printed during the same sweep. Because the height of a given region is almost never an integral multiple of the height of a pen, a portion of the pen extends beyond the region being printed during one or more passes. The nozzles in the portion of the pen that extend beyond the current region go unused. By not using all the available nozzles at any given time, more sweeps are required to print a page than would otherwise be needed if all nozzles were utilized. The time required to print a page is directly proportional to the number of sweeps of the print carriage.

One approach to avoiding carriage sweeps with unused nozzles because of printing adjacent regions with different printmodes, is to print multiple regions with a single, "least common denominator" printmode. This approach avoids the overhead of switching between printmodes, but may result in loss of print quality when the single printmode is not optimal for some of the regions being printed. What is needed is a way to reduce the time to print a page by minimizing unused nozzles while retaining optimal print quality.

SUMMARY

A method of reducing the time required for an inkjet printer to print a page minimizes unused pen nozzles during printmode transitions.

An image to be printed by an inkjet printer is represented in terms of rows of dots, each dot printed by a pen nozzle. An algorithm for transforming the image to the representation in terms of dots depends on a global printmode, which includes factors such as type of print medium, user-specified quality, and input data format. The algorithm also depends on a regional printmode that depends on the content of the data representing the image to be printed. Consecutive rows that share a common regional printmode are termed an image region. The regional printmode may change many times on a single page.

The data representing the dots that are printed in a single sweep of a carriage carrying pens across a print medium is termed a swath. The maximum number of rows of dots in a swath is equal to the number of nozzles on a pen. According to an embodiment of the present invention, a swath contains data from more than one image region.

The process of generating a swath is divided into a cleaver process and a packer process. The cleaver processes the data representing the image to generate an intermediate output termed a cut. The process of generating a cut includes determining the direction in which the data is to be printed. The number of rows in a cut is less than or equal to the number of rows in a swath. The packer module accumulates cuts into directional buffers, that is one buffer for printing left to right and one for printing right to left. The packer adds data from the cut being processed to the appropriate directional buffer if the cut data and the directional buffer data are compatible. The data in the cut and in the directional buffer are compatible if they can be printed at the same time without loss of print quality.

If the cut is too large to fit on the selected directional buffer, or if cut data is not compatible with the directional buffer, the printer is controlled to print the contents of the directional buffer. When an instruction is issued to control the printer to print the contents of the directional buffer, the position of the data in the directional buffer on the output medium is checked against the position of the data in the second directional buffer. If the data in the second directional buffer is located higher on the output medium than the position of the data in the selected directional buffer, the contents of the second directional buffer will be printed before the contents of the first directional buffer.

BRIEF DESCRIPTION OF THE DRAWINGS

FIG. 4a represents data to be printed. FIG. 4b illustrates the swaths by which the data of FIG. 4a is printed using prior art methods. FIG. 4c illustrates the swaths by which the data of FIG. 4a is printed according to a method of the present invention.

The use of the same reference symbols in different drawings indicates similar or identical items.

DETAILED DESCRIPTION

A method of reducing the time required for an inkjet printer to print a page minimizes unused pen nozzles during printmode transitions. According to the method, image data from more than one image region is printed during a single sweep of a printer carriage.

Figure 1:
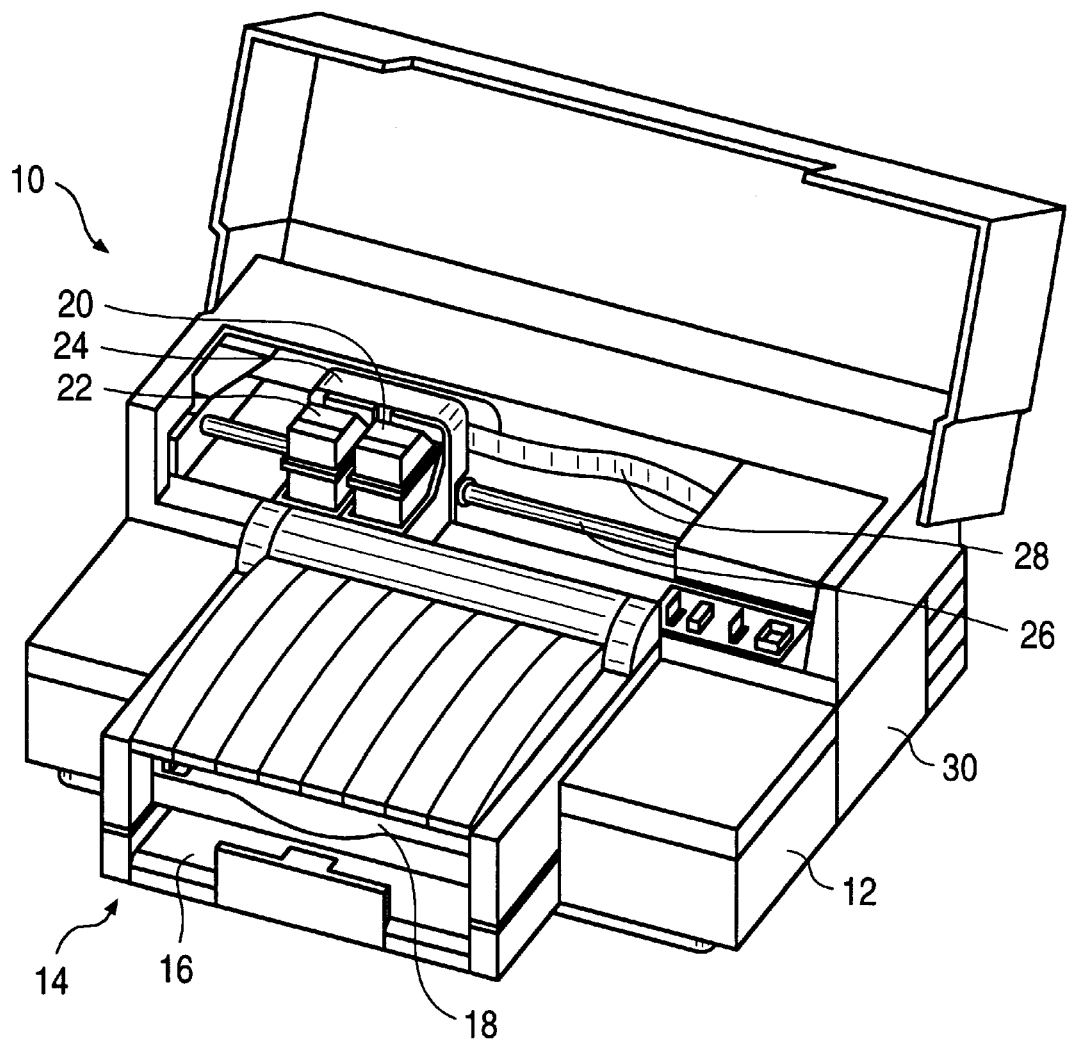
FIG. 1 is an inkjet printer in which embodiments of the present invention are practiced.

The method can be applied, for example, in color inkjet printer 10, illustrated in FIG. 1. The color inkjet printer includes a chassis 12 and a print medium handling system 14 for supplying a print medium such as a sheet of paper to printer 10. The print medium handling system 14 includes a feed tray 16, an output tray 18, and a series of rollers (not shown) for delivering the sheets of paper from the feed tray 16 into position for receiving ink from an inkjet cartridge, such as a color ink cartridge 20 and/or a black ink cartridge 22. The illustrated color cartridge 20 is a tri-color pen, although alternatively (not shown), a group of discrete monochrome pens may be used, or a single monochrome black pen 22 may be used. The cartridges may print at 300 dots-per-inch (DPI), 600 DPI, 1200 DPI or any other resolution.

The cartridges or pens 20, 22 are transported by a carriage 24 which may be driven along a guide rod 26 by a conventional drive belt/pulley and motor arrangement (not shown). The pens 20, 22 may be conventional pens, which selectively deposit one or more ink droplets on a print medium in accordance with instructions received via a conductor strip 28 from a printer controller 30 located within chassis 12, for instance at the location shown in FIG. 1. The controller 30 generally receives instructions from a computer (not shown), such as a personal computer. A monitor (not shown) coupled to the computer may be used to display visual information to an operator. Personal computers, their input devices, such as a keyboard and/or a mouse device (not shown), and monitors are well known to those skilled in the art.

An image to be printed by printer 10 is typically first generated in a computer; however, the original image may be generated by any other means. Generation of hardcopy output from a computer file or screen display typically involves several steps. These steps may occur in a printer driver (not shown) residing in the host computer, in the software contained in the printer, in the printer hardware itself, or in any combination of these locations.

To generate hardcopy output, the image is transformed to a representation in terms of rows of dots that are printed by pens 20, 22 under the control of controller 30. An algorithm for transforming the image to the representation in terms of dots is a function of a set of printing parameters termed a global printmode. The global printmode depends on such factors as type of print media, user quality specification such as "best," "normal," or "draft," and input data format, such as color representation in terms of RGB (monitor format) or KCMY (printer format). The global printmode is typically constant for an entire page or portion thereof. The transformation algorithm also depends on a regional printmode, which is a set of printing parameters that reflects the content of the image data to be printed, such as text, graphics, or photographic image. The regional printmode may also specify fine distinctions within image data such as single pass graphics printed either direction, 2-pass graphics printed alternate directions, single pass text printed either direction, and single pass text printed left to right. Methods of analyzing image data to determine regional printmodes are known in the art. A collection of consecutive rows which share a common regional printmode is called an image region. The regional printmode may change many times on a single page. Collectively, the global printmode and the regional printmode are termed the sub-printmode. The purpose of a sub-printmode is to optimize the tradeoff between print quality and speed for a given portion of an image.

The data representing the dots that are printed in a single sweep of carriage 24 across guide rod 26 is referred to as a swath. The number of rows contained in a swath is limited to the number of nozzles in pens 20, 22. In the prior art, a swath contains data from only one image region. In that case, all the data in a swath corresponds to the same sub-printmode. In the prior art, a firmware module termed a swather, located on printer controller 30, examines a data stream consisting of the image data represented in terms of rows of dots. Alternatively, the swather is part of the printer driver in a personal computer attached to the printer. The swather accumulates consecutive image rows until the number of rows exceeds the number of nozzles on the pens, an end-of-region is encountered, or the number of rows exceeds the number requested by the sub-printmode in its current state. When one of these conditions is met, the contents of the swath buffer are transmitted to a sweep manager that controls portions of the printer mechanism, such as carriage 24 and pens 20, 22 to print the swath.

According to an embodiment of the present invention, the process of generating a swath is divided into a cleaver process and a packer process. Both the cleaver and the packer can be implemented in firmware on the printer controller. Alternatively, the cleaver and packer are implemented in the printer driver on a personal computer attached to the printer. The cleaver operates much like the swather in the prior art, except that instead of placing output directly in a swath, it generates an intermediate output termed a cut. The number of rows in a cut is less than or equal to the number of rows in a swath. The packer module accumulates cuts into directional buffers. Typically, one directional buffer accumulates the rows of dots that are printed as printer carriage 24 sweeps from left to right, and one directional buffer accumulates the rows of dots that are printed as printer carriage 24 sweeps from right to left. The packer combines data from more than one region into a single swath if the data are compatible. When appropriate criteria are met, a directional buffer is emptied and instructions are transmitted to portions of the sweep manager to print the contents of the directional buffer. Typically, the contents of the directional buffer are transmitted first to a swath buffer, as in the prior art, which, in turn, is transmitted to the sweep manager.

Figure 2:
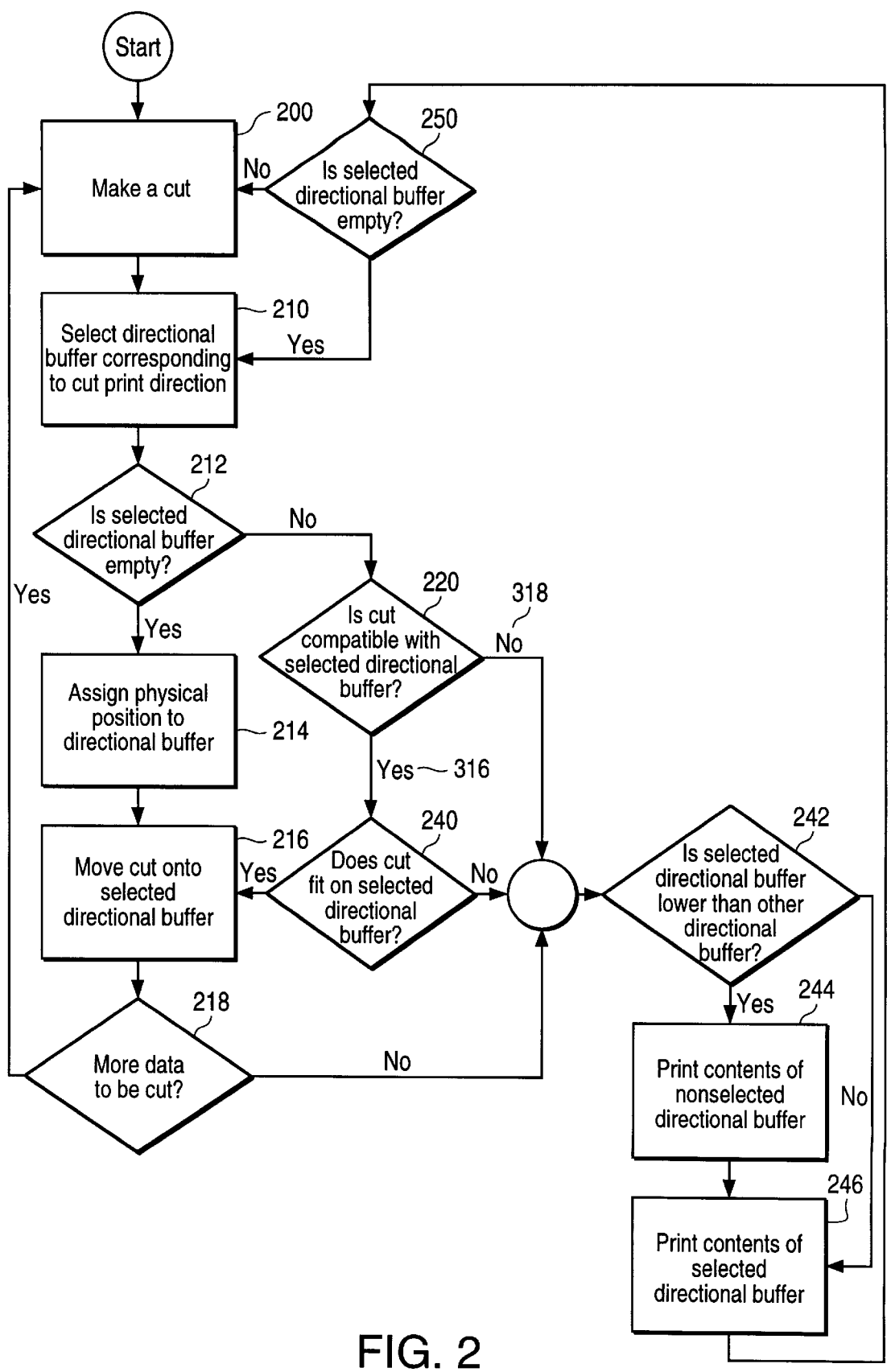
FIG. 2 is a flow diagram of the packer process according to the present invention.
Figure 3:
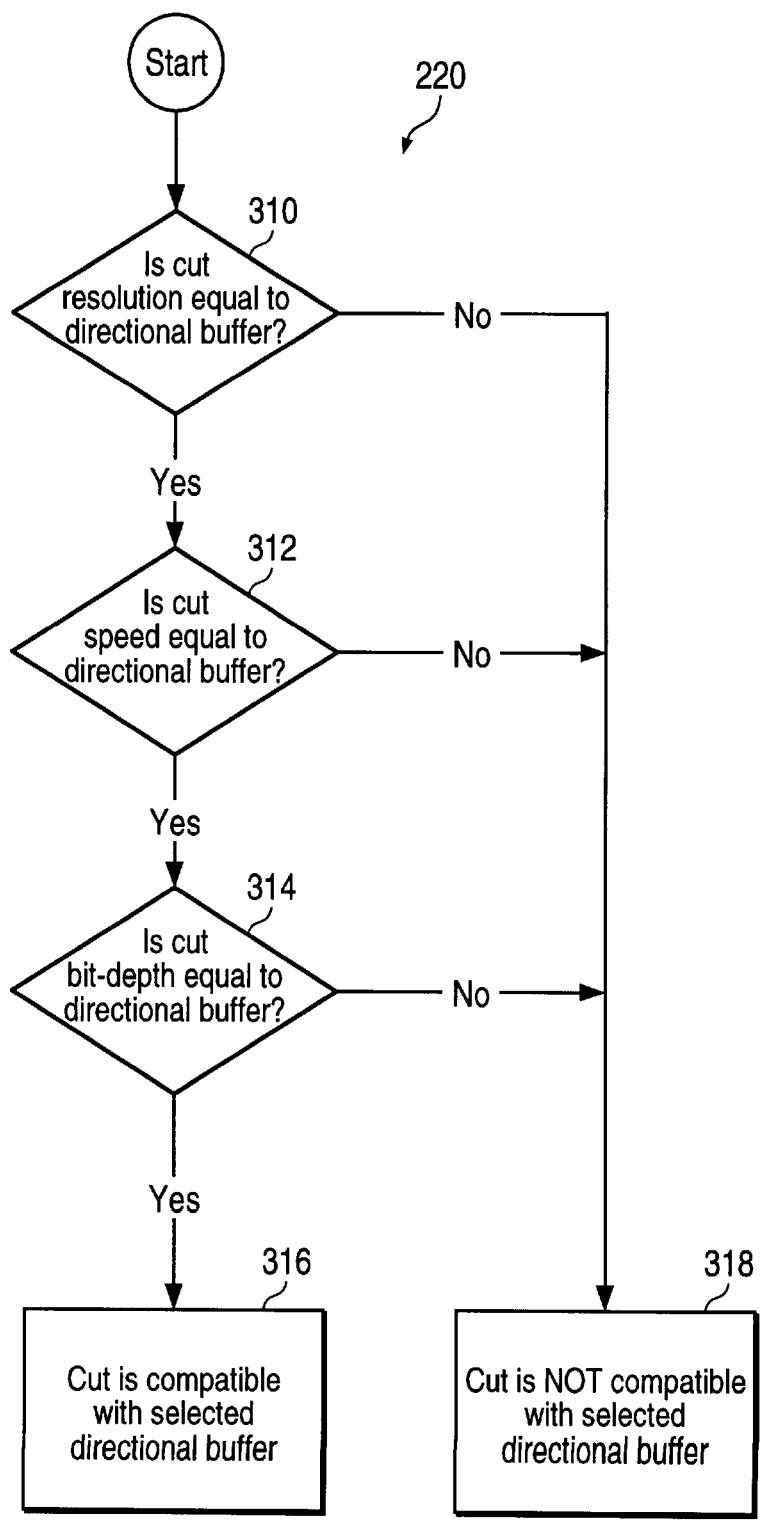
FIG. 3 is a flow diagram of an example of the test of whether a cut is compatible with a directional buffer.

The operations performed by the cleaver and the packer are illustrated in the flow diagrams of FIGS. 2 and 3. The function of the cleaver is summarized at step 200 in FIG. 2, as "make a cut." The number of rows of dots the cleaver places into a cut depends on the printing parameters of the global printmode such as the print medium, user-specified data quality, and the data format, and on the data content. Furthermore, the cleaver algorithm for each model of printing device is optimized for the mechanical details of that device and, optionally, for environmental factors, such as the instantaneous temperature of the printhead and instantaneous nozzle condition. Swathers that place an appropriate number of rows in a swath buffer depending on the above-listed parameters are known in the art. For data types, other than text, the algorithms by which the cleaver determines the number of rows of dots to place in a cut correspond to the algorithms by which swathers determine the number of rows of dots to place in a swath buffer. When processing text in other than draft mode, swathers are typically designed to place an integral number of lines of text in a swath buffer. Swathers generally process, at the same time, a number of rows that corresponds to the maximum integral number of lines of text that fit on pens 20, 22. According to the present invention, the cleaver places one line of text at a time in a cut to facilitate combining the text at the edge of a text region with image data from an adjacent, different image region.

The process of making a cut includes a determination of the direction in which the rows in the cut are to be printed. Returning to FIG. 2, at step 210, a directional buffer corresponding to the print direction of the cut is selected. At step 212, the selected directional buffer is queried as to whether it is empty. If the selected directional buffer is empty, at step 214, a physical position on the output medium is associated with the directional buffer and at step 216, the contents of the cut are moved onto the directional buffer. At step 218, the input data stream is queried as to whether there is more data. If there is more data in the input stream, control returns to step 200.

Returning to step 212, if the selected directional buffer is not empty, at step 220, the attributes of the cut are compared with the attributes of the image data on the selected directional buffer to see if the cut is compatible with the selected directional buffer. Each sub-printmode is associated with a set of attributes that describe in detail how the printing is done. Different sub-printmodes may nonetheless correspond to the same attributes.

One example of the determination of whether a cut is compatible is given in the flow diagram of FIG. 3. At step 310, the resolution of the data in the cut is compared with the resolution of the data in the directional buffer. At step 312, the carriage speed at which the data in the cut is printed is compared with the carriage speed corresponding to the data in the directional buffer. At step 314, the bit-depth, or number of bits used to store the intensity of each dot, is compared. If all the tests are positive, the cut is determined to be compatible with the directional buffer at step 316. If one of the tests fails, the cut is determined not to be compatible (318). Note that the cut can correspond to a different image region than the data on the directional buffer and still be compatible.

If the cut is compatible (316), at step 240, shown in FIG. 2, a test is executed to determine if the cut can fit on the selected directional buffer. To fit on the selected directional buffer, the cut must have a number of rows smaller than the available number of rows on the directional buffer and must correspond to the physical region on the print medium associated with the directional buffer. The maximum number of rows on the directional buffer is the number of nozzles on pens 20, 22.

If the cut is not compatible with the selected directional buffer or if the cut does not fit on the selected directional buffer or if there is no more image data to process, control passes to step 242. At step 242, the selected directional buffer is compared with the non-selected directional buffer. If the selected directional buffer corresponds to a physical position on the output medium that is lower than the physical position corresponding to the non-selected directional buffer, at step 244, the contents of the non-selected directional buffer are transferred to the sweep manager to be printed. Next, the contents of the selected directional buffer are transferred to the sweep manager at step 246. If at test 244, the selected directional buffer is higher on the page, control transfers immediately to step 246. In this way, printing always proceeds down the medium. From step 246, control transfers to step 250 where a test is executed to determine if a previous cut is still available. If the result of the test at step 220 or step 240 was negative, then the previous cut is still available.

The benefits of combining image date from two or more image regions in a single sweep of a printer carriage are illustrated in the following examples.

EXAMPLE 1

FIG. 4a shows data to be printed consisting of three image regions: a top image region of single pass graphics printed in either direction, 41; a middle image region of 2-pass graphics printed alternate directions starting left to right, 42; and a bottom image region of single pass graphics printed in either direction, 41. In the prior art, the data for FIG. 4a is printed in four swaths 40a–40d, or separate sweeps of printer carriage 24, as shown in FIG. 4b. The length of each swath 40a–40d corresponds to the number of nozzles on pens 20 and 22. Unused nozzles are denoted by reference numeral 44. Print direction across the medium is indicated by arrows at the bottom of each swath, such as arrows 45 and 46. Because the top image region is smaller than the swath size and only one image region is included in each swath, the bottom portion of swath 40a consists of unused nozzles 44. Similarly, the two swaths, 40b and 40c, used to print the middle image region consisting of 2-pass graphics 42, also have substantial bottom portions of unused nozzles 44.

In contrast, as shown in FIG. 4c, according to the present invention which combines data from different image regions in a single swath, the data of FIG. 4a is printed in only two swaths, 48a and 48b. Swath 48a includes the single-pass graphics, 41, of the top image region and the first pass of the two-pass graphics 42 of the middle image region. Swath 48b includes the second pass of the middle image region and the bottom image region of single pass graphics 41. The single pass graphics regions 41 are printed in either direction. The top image region is printed left to right, direction 45, in swath 48a, while the bottom image region is printed right to left, direction 46, in swath 48b.

EXAMPLE 2

Figures 5A, 5B, 5C:
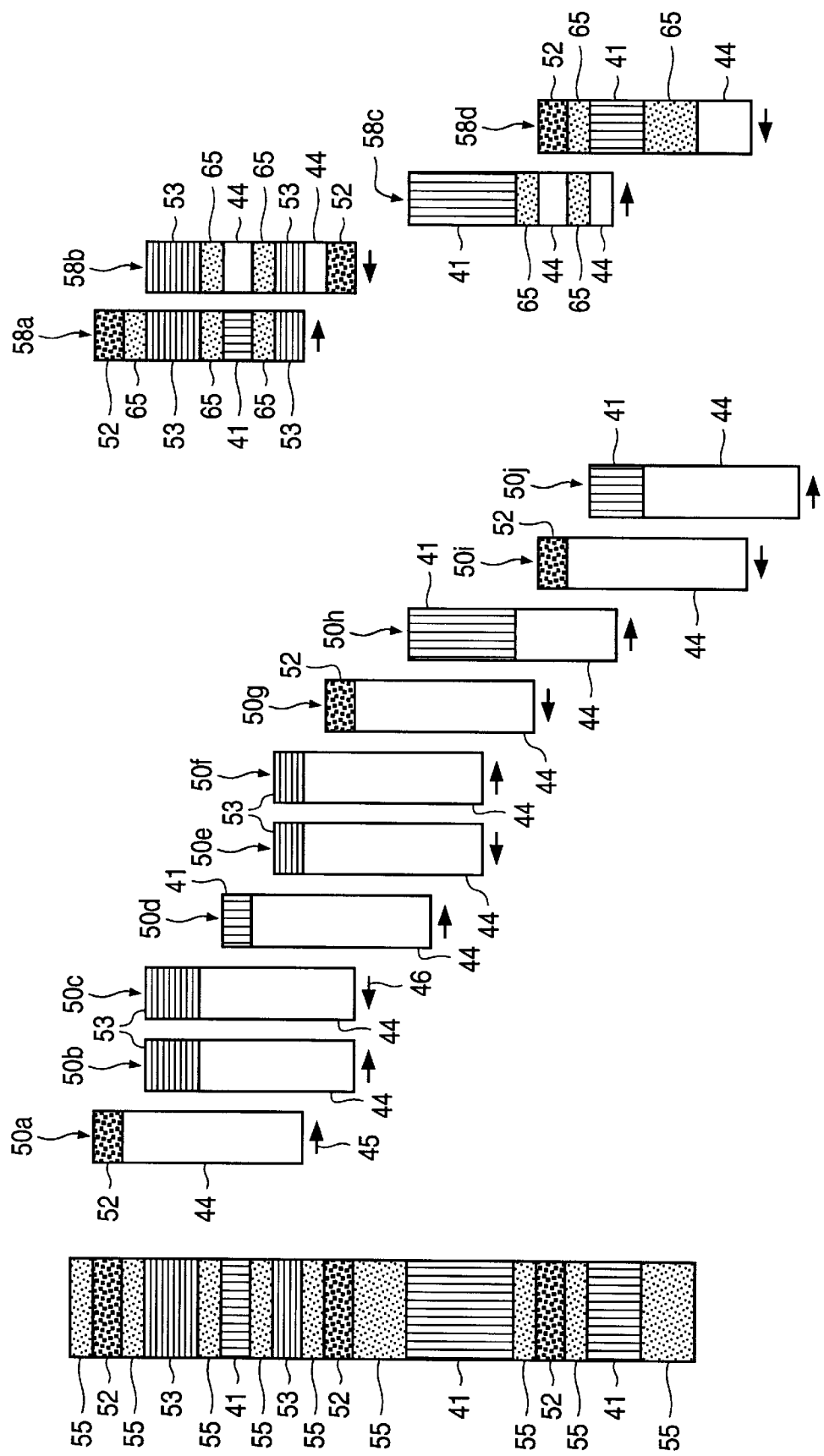
FIG. 5a represents a second example of data to be printed.
FIG. 5b illustrates the swaths by which the data of FIG. 5a is printed using prior art methods.
FIG. 5c illustrates the swaths by which the data of FIG. 5a is printed according to a method of the present invention.

Data consisting of multiple image regions is shown schematically in FIG. 5a. The data include the following additional data types: single-pass text printed in either direction, 52; 2-pass graphics printed alternate directions 53; and blank rows 55. In the prior art, the data of FIG. 5a is printed in the ten swaths, 50a–50j shown in FIG. 5b. Because each image region in the data of FIG. 5a is much smaller than the swath size, and each swath has only data from a single image region, substantial portions of swaths 50a–50j consist of unused nozzles 44. When the data is printed according to the present invention, the number of swaths needed is reduced to four, swaths 58a–58d, shown in FIG. 5c. Note that swaths 58a–58d include skipped regions 65, consisting of deliberately unused nozzles, corresponding to blank rows 55 in the data of FIG. 5a. The skipped regions do not represent wasted nozzles but arise because data from two different image regions separated by blank rows are included in the same swath.

The examples demonstrate that the present invention allows the number of unused nozzles to be minimized during printmode transitions, thus reducing the time required for an inkjet printer to print a page.

Although the invention has been described with reference to particular examples of the operation of the cleaver and packer process, the description is only an example of the invention's application and should not be taken as a limitation. Various adaptations and combinations of features of the examples disclosed are within the scope of the invention as defined by the following claims.

We claim:

1. A method for controlling an inkjet printer to print an image on an output medium, the image comprising at least two image regions, each image region associated with a regional printmode depending on a content of the image region, the inkjet printer comprising a printhead that passes across the output medium transferring a portion of the image to the output medium on each passage across the output medium, the method comprising:

controlling the printhead to transfer portions of more than one image region to the output medium during a single passage across the output medium, wherein at least two of the more than one image region are associated with different regional printmodes, wherein each regional printmode is associated with printing attributes;

wherein said more than one image region is transferred from the printhead to the output medium during said single passage of the printhead across the output medium if the printing attributes of the more than one image region are compatible with each other; and wherein the printing attributes comprise data resolution.

2. The method of claim 1 wherein the content of the image region is text, graphics, or a photographic image.

3. A method for controlling an inkjet printer to print an image on an output medium, the image comprising at least two image regions, each image region associated with a regional printmode depending on a content of the image region, the inkjet printer comprising a printhead that passes across the output medium transferring a portion of the image to the output medium on each passage across the output medium, the method comprising:

controlling the printhead to transfer portions of more than one image region to the output medium during a single passage across the output medium, wherein at least two of the more than one image region are associated with different regional printmodes, wherein each regional printmode is associated with printing attributes;

wherein said more than one image region is transferred from the printhead to the output medium during said single passage of the printhead across the output medium if the printing attributes of the more than one image region are compatible with each other; and wherein the printing attributes comprise carriage speed.

4. A method for controlling an inkjet printer comprising the acts of:

(i) providing a representation of an image to be printed on an output medium in terms of rows of dots, the image comprising a plurality of image regions, each image region associated with printing attributes depending on a content of the image region;

(ii) placing a plurality of the rows in a cut, the rows corresponding to a single image region, a number of rows in the cut being less than or equal to a number of rows in the representation of the image, and the cut associated with a specific print direction, wherein there are two possible print directions;

(iii) transferring the cut to a selected directional buffer corresponding to the specific print direction if (a) the selected directional buffer is empty, or (b) the printing attributes associated with the image region of the cut are compatible with the printing attributes associated with contents of the selected directional buffer and a number of unfilled rows in the selected directional buffer is equal to or larger than the number of rows in the cut;

(iv) providing an instruction to print the contents of the selected directional buffer on the output medium; and (v) repeating acts (ii) and (iii) if any rows remain in the representation of the image.

5. The method of claim 4 wherein transferring the cut to the selected directional buffer if the selected directional buffer is empty further comprises associating a physical position on the output medium with the selected directional buffer.

6. The method of claim 5 wherein providing an instruction to print the contents of the selected directional buffer on the output medium comprises testing whether the physical position on the output medium associated with the selected directional buffer is higher than a physical position on the output medium associated with a nonselected directional buffer associated with the other print direction.

7. The method of claim 6 wherein providing an instruction to print the contents of the selected directional buffer on the output medium further comprises providing an instruction to print contents of the nonselected directional buffer before providing an instruction to print the contents of the selected directional buffer if the physical position on the output medium associated with the nonselected directional buffer is higher than the physical position on the output medium associated with the selected directional buffer.

8. The method of claim 7 wherein providing an instruction to print the contents of the selected directional buffer on the output medium is providing an instruction to print the a contents of the selected directional buffer on the output medium if the printing attributes associated with the image region of the cut are not compatible with the printing attributes associated with the contents of the selected directional buffer, or if a number of unfilled rows in the selected directional buffer is smaller than the number of rows in the cut, or if there are no more rows remaining in the representation of the image that have not been placed in the cut.

9. The method of claim 1 wherein a maximum number of rows in the first directional buffer is equal to a number of nozzles on a pen of the inkjet printer.

10. The method of claim 4 wherein the content of the image region is text, graphics, or a photographic image.

11. The method of claim 4 wherein the method is performed in firmware on the inkjet printer.

12. The method of claim 4 wherein the method is performed in a printer driver on a personal computer connected to the inkjet printer.

13. An inkjet printer for printing an image on an output medium, the image having a representation in terms of rows of dots and the image comprising a plurality of image regions, each image region associated with printing attributes depending on content of the image region, the inkjet printer comprising:

a chassis;

an output medium handling system within the chassis for positioning the output medium for printing;

a carriage for transporting pens across the output medium;

a controller providing instructions to the carriage and the pens to print on the output medium according to a method comprising the acts of:

(i) placing a plurality of the rows in a cut, the rows corresponding to a single image region, the number of rows in the cut being less than or equal to the number of rows in the representation of the image, and the cut associated with a specific print direction wherein there are two possible print directions;

(ii) transferring the cut to a directional buffer corresponding to the specific print direction if (a) the directional buffer is empty, or (b) the printing attributes associated with the image region of the cut are compatible with the printing attributes associated with contents of the directional buffer and a number of unfilled rows in the directional buffer is equal to or larger than the number of rows in the cut;

(iii) instructing at least one pen to print the contents of the directional buffer on the output medium as the at least one pen is transported by the carriage across the output medium; and (iv) repeating acts (i) and (ii) if any rows remain in the representation of the image.

14. The inkjet printer of claim 13 wherein instructing at least one pen to print the contents of the directional buffer on the output medium is instructing at least one pen to print the contents of the directional buffer on the output medium if the printing attributes associated with the image region of the cut are not compatible with the printing attributes associated with the contents of the directional buffer, or if a number of unfilled rows in the directional buffer is smaller than the number of rows in the cut, or if there are no more rows remaining in the representation of the image that have not been placed in the cut.

* * * * *

UNITED STATES PATENT AND TRADEMARK OFFICE
CERTIFICATE OF CORRECTION

PATENT NO.   : 6,328,396 B1
DATED        : December 11, 2001
INVENTOR(S)  : Smith et al.

It is certified that error appears in the above-identified patent and that said Letters Patent is hereby corrected as shown below:

<u>Column 8,</u>
Line 24, after "the", delete "a".
Line 33, delete "claim 1" and insert therefor -- claim 4 --.

Signed and Sealed this

Thirtieth Day of July, 2002

*Attest:*

*Attesting Officer*

JAMES E. ROGAN
*Director of the United States Patent and Trademark Office*